United States Patent
Jantz et al.

(10) Patent No.: US 9,528,623 B2
(45) Date of Patent: Dec. 27, 2016

(54) POSITIONING DEVICE FOR A PROCESS PLANT

(71) Applicants: Johannes Jantz, Neu-Anspach (DE); Bernd Kunz, Edertal/Hemfurth (DE)

(72) Inventors: Johannes Jantz, Neu-Anspach (DE); Bernd Kunz, Edertal/Hemfurth (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 109 days.

(21) Appl. No.: 14/256,057

(22) Filed: Apr. 18, 2014

(65) Prior Publication Data

US 2014/0312259 A1  Oct. 23, 2014

(30) Foreign Application Priority Data

Apr. 18, 2013  (DE) .................. 10 2013 006 777

(51) Int. Cl.
| | |
|---|---|
| *F16K 27/00* | (2006.01) |
| *F16B 1/00* | (2006.01) |
| *F16K 27/02* | (2006.01) |
| *F16K 31/126* | (2006.01) |
| *F16B 39/10* | (2006.01) |

(52) U.S. Cl.
CPC ....... *F16K 27/0254* (2013.01); *F16K 27/0281* (2013.01); *F16K 31/126* (2013.01); *F16B 39/108* (2013.01); *F16B 2001/0092* (2013.01); *F16K 27/00* (2013.01)

(58) Field of Classification Search
CPC .. F16K 31/126; F16K 27/00; F16B 2001/0092
USPC .......... 137/315.29; 251/61.2, 128, 367, 369; 277/612, 614, 639, 643, 315, 616, 625, 277/649, 908
See application file for complete search history.

(56) References Cited

U.S. PATENT DOCUMENTS

| | | | | |
|---|---|---|---|---|
| 2,307,440 | A | * | 1/1943 | Wilson ..................... F16L 23/20 |
| | | | | 277/609 |
| 2,316,974 | A | * | 4/1943 | Risley ..................... F16L 41/06 |
| | | | | 277/606 |
| 2,449,119 | A | * | 9/1948 | Holicer .................... F17C 13/04 |
| | | | | 137/512.3 |
| 2,456,493 | A | | 12/1948 | Drane |
| 2,657,078 | A | * | 10/1953 | Virgil ...................... B60T 17/04 |
| | | | | 277/614 |
| 3,175,573 | A | * | 3/1965 | Vater ...................... F16J 15/184 |
| | | | | 137/312 |

(Continued)

FOREIGN PATENT DOCUMENTS

| | | |
|---|---|---|
| DE | 3610541 A1 | 10/1987 |
| DE | 102005060120 A1 | 6/2007 |

(Continued)

*Primary Examiner* — Kevin Murphy
*Assistant Examiner* — Jonathan Waddy
(74) *Attorney, Agent, or Firm* — Schiff Hardin LLP

(57) ABSTRACT

In a positioning device for a processing plant, a valve is provided comprising a valve housing, a valve seat, and a valve member actuated by use of a lead-through opening in the valve housing. A top is provided for screwing on the lead-through opening and for rigidly coupling the valve housing to an actuator. A deformation buffer is arranged or formed on mutually opposite respective screw stop surfaces of the top and of the valve housing and which is deformed in a predetermined manner when screwing the top on the lead-through opening.

21 Claims, 3 Drawing Sheets

(56) References Cited

U.S. PATENT DOCUMENTS

| | | | |
|---|---|---|---|
| 3,204,925 A | 9/1965 | Montuori | |
| 3,257,095 A * | 6/1966 | Siver | F16K 27/08 251/214 |
| 3,463,196 A * | 8/1969 | Richardson | B65D 59/00 138/96 R |
| 3,721,452 A | 3/1973 | Black | |
| 3,993,284 A * | 11/1976 | Lukens, Jr. | F16K 27/08 137/315.29 |
| 4,101,138 A * | 7/1978 | Gaggiano | F16J 15/061 123/193.3 |
| 4,421,293 A * | 12/1983 | Koch | F16K 31/1262 251/61.2 |
| 4,436,310 A * | 3/1984 | Sawabe | F16D 3/2055 277/630 |
| 4,452,428 A | 6/1984 | Scaramucci | |
| 4,522,536 A * | 6/1985 | Vidrine | F16L 23/003 277/314 |
| 5,145,219 A * | 9/1992 | Babuder | F16L 19/0212 277/609 |
| 5,531,573 A * | 7/1996 | Nokubo | B60T 8/368 277/648 |
| 6,367,803 B1 * | 4/2002 | Loth | F16L 23/18 277/321 |
| 6,905,108 B2 | 6/2005 | Hall et al. | |
| 7,364,166 B2 * | 4/2008 | Yoakam | F16L 19/0218 277/608 |
| 2005/0280214 A1 | 12/2005 | Richards | |
| 2012/0001103 A1 | 1/2012 | Kiesbauer et al. | |

FOREIGN PATENT DOCUMENTS

| | | |
|---|---|---|
| DE | 102010025635 A1 | 1/2012 |
| EP | 1816378 A2 | 8/2007 |
| FR | 2712645 A1 | 5/1995 |
| GB | 540325 | 10/1941 |
| GB | 2138912 A | 10/1984 |

* cited by examiner

POSITIONING DEVICE FOR A PROCESS PLANT

BACKGROUND

The disclosure relates to a positioning device or valve assembly for a process plant, such as a petrochemical plant, a brewery, a nuclear plant or the like.

The positioning device comprises a valve such as a control valve with a valve housing, a valve seat and a valve member, a top, such as a yoke, and a bonnet or a drive-rod guide or drive-shaft guide. The top is designed to be screwed into a lead-through opening or guide opening in the valve housing, in order to be used as a supporting structure for connecting an actuator housing. The positioning device does not necessarily have to be equipped with an actuator, such as a pneumatic actuator, fastened to the top. The control valve can also be installed later. Usually, however, the positioning device is a unit made up of control valve, top and actuator.

An example for a positioning device is known from U.S. Pat. No. 6,905,108 B2, in which within a support structure, which is produced in one piece, the top realizes both a yoke function and also a drive-rod guiding function. A sealing arrangement, such as a sealing package, is accommodated in a drive-rod duct of the top, in order to seal the control valve interior in the region of the duct for the actuator rod or the actuator shaft of the actuator.

A proven positioning device is known from DE 10 2010 025 635 B4, in which the top accommodates the sealing package and also compression springs for axially prestressing the sealing package. The top is screwed into the lead-through opening of the valve housing. The top is used to guide the drive rod of the actuator for actuating the valve member with respect to the valve seat.

When screwing in the top including the yoke, assembly difficulties arose, especially in the case of inexperienced operating personnel. Due to the lack of rotational symmetry of the top, it is difficult in the case of the inherently proven screwing of the top, to adjust a certain relative position of the top with respect to the valve housing or the actuator housing, without either over-rotating the top with respect to the valve housing or imparting insufficient screwing force thereto. Owing to the rather high lever arms of the yoke structure with respect to the screwing axis, it may also come to pass that an inadvertent detaching of the top from the valve housing is caused, especially if, upon reaching the desired rotational position of the top, insufficient screwing forces are still acting between the top and the valve housing.

SUMMARY

It is an object to overcome the disadvantages of the prior art, particularly to improve a positioning device for a process plant such that both the danger of an inadvertent detaching of the top from the valve housing is minimized and also the positioning of the upper part relative to the valve housing is ensured precisely and as desired, while maintaining a fixed and releasable coupling of the upper part to the valve housing.

In a positioning device for a processing plant, a valve is provided comprising a valve housing, a valve seat, and a valve member actuated by use of a lead-through opening in the valve housing. A top is provided for screwing on the lead-through opening and for rigidly coupling the valve housing to an actuator. A deformation buffer is arranged or formed on mutually opposite respective screw stop surfaces of the top and of the valve housing and which is deformed in a predetermined manner when screwing the top on the lead-through opening.

DESCRIPTION OF EXEMPLARY EMBODIMENTS

Figure 1:
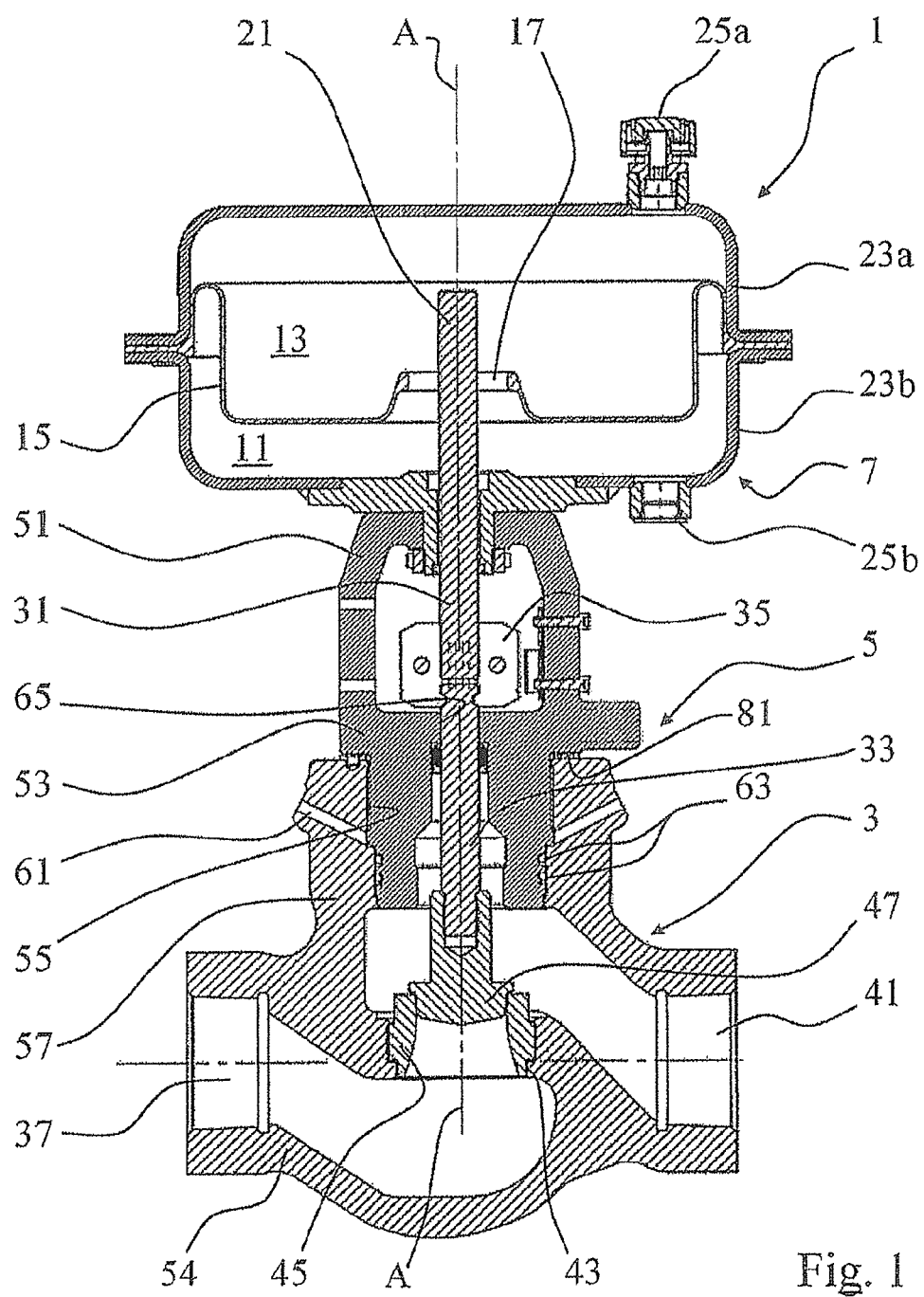
FIG. 1 shows a cross-sectional view of a positioning device according to the exemplary embodiment with a control valve, an actuator and a top rigidly coupling the control valve to the actuator.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in illustrated embodiments and such further applications of the principles of the invention as illustrated as would normally occur to one skilled in the art to which the invention relates are included herein.

A positioning device or valve assembly, particularly control valve assembly, for a process plant, such as a petrochemical plant, a brewery, a nuclear plant or the like is provided. The positioning device comprises a valve, particularly a control valve, with a valve housing, which can be connected to pipelines of the plant, and structurally fixes a valve seat in the interior, with which a positionable valve member of the control valve interacts in a closing, to some extent even completely opening, manner. To actuate the valve member by means of an actuator or drive, which may be part of the positioning device, the valve housing comprises a lead-through opening or guiding duct on the actuator side, particularly for leading or guiding through an actuating rod actuated by the actuator, which carries the valve member on the valve-seat-side end thereof. Furthermore, the positioning device has a top or upper part or top member, which can be termed a yoke, bonnet or drive-rod guide or drive-shaft guide in the field of process technical field devices. The top is assembled as a separate mounting part of the positioning device, in order to provide the option of incorporating a larger lead-through opening into the valve housing for simple accessibility. The top can be single-part or multi-part, in order to realize the yoke function, bonnet function or guide function. The top is designed to be screwed into the lead-through opening, wherein the top can be used at least to some extent as a coupling structure for the supporting connection of the actuator onto the valve housing. According to the exemplary embodiment, a deformation buffer is arranged or formed on mutually opposite screw stop surfaces of the top and the valve housing, which can be deformed in a predetermined manner during screwing, particularly screwing in, of the top. The deformation buffer is used to prevent a sudden generation of axial screw pressure forces between the screw stop surfaces, in that the build-up of axial screwing pressure forces with continuing screwing movement is delayed on the rotational path. In this manner, it is also possible for inexperienced assembly personnel to generate a satisfactory assembly fixing force between the top and the valve housing, wherein a desired rotational position of the top with respect to the valve housing can be assumed in a positionally accurate manner. One advantage of the deformation buffer is in particular in dampening pressure shocks occurring in the process medium such that the top is not loosened. This advantage arises from the buffer resilience by means of elastic deformation of the deformation buffer.

Preferably, the screw stop surface of the valve housing is formed by means of an end face or abutting face of a protruding housing neck, which is radial with respect to an axial direction of extent of an actuating rod or actuating shaft of the actuator, while the stop surface of the top can be formed by an annular shoulder located radially externally or radially internally, depending on whether the top is screwed into the lead-through opening of the valve housing or whether the annular shoulder radially surrounds the housing neck of the valve housing.

Preferably, the deformation buffer is formed as a separate base ring structure, which can have a disc shape as a basic form, which may provide a considerable deformation volume even in this basic form, in order to achieve the desired rotational delay when building up the screw pressure force. The deformation buffer can have a predetermined shaping or profiling, such as a wave structure, in the form of an annular disc, in order to increase the desired deformation volume. The deformation buffer can also be formed on the top side or valve-housing side in one piece with the top or with the valve housing.

In one preferred exemplary embodiment, the deformation buffer is coupled to the top of the valve housing such that, when screwing the top, the deformation buffer is held stationarily or immovably with respect to the top or to the valve housing. Thus, the deformation buffer can be equipped with a rotational lock, which prevents an entrainment in rotation when screwing the top either with respect to the top or to the valve housing. In one preferred exemplary embodiment, the deformation buffer is inserted as a separate assembly part between the top and the valve housing. The deformation buffer preferably has an in particular annular clamping side facing the valve housing and an in particular annular clamping side facing the top.

Preferably, the deformation buffer is constructed as a disc-shape, in particular a closed base ring structure, the two clamping sides of which are preferably in sections shaped in a planar manner.

In one preferred exemplary embodiment, to form the rotational lock of the deformation buffer, the deformation buffer can in particular have at least one protruding engaging nose. Preferably, the engaging nose protrudes from one or both clamping sides of the base ring structure. To form the rotational lock, the at least one engaging nose can preferably loosely engage into an engagement depression, which is shaped complementarily thereto, on the screw stop surface of the top of the valve housing. The at least one engaging nose can be formed as a solid body or as a passage, eyelet or rim hole. The engagement depression can be realized as a blind hole. In one exemplary embodiment, the at least one engaging nose is a solid body fastened by means of welding on.

Preferably, a plurality of engaging noses are formed particularly with a constant circumference section of 120°, 90°, or 60° between adjacent engaging noses on the base ring structure. Preferably, all of the engaging noses are formed on one and the same of the two clamping sides of the base structure. With reference to the number of engaging noses, equally many engagement depressions or a larger number of engagement depressions may be present on the screw stop surface of the top or of the valve housing. In this case, the engagement depressions are arranged in such a manner that in a certain rotational position, the base ring structure is held stationarily on the top or on the valve housing, while all engaging noses are accommodated in engagement depressions.

In a development of the exemplary embodiment, the deformation buffer has at least one desired deformation zone on a clamping side facing the top and/or facing the valve housing, particularly facing the respective screw stop surfaces. The desired deformation zone is a locally delimited region with respect to the in particular planar clamping side and comprises a predetermined deformation volume. The at least one desired deformation zone is preferably only formed on one of the two clamping sides, while the other clamping side is realized free of desired deformation zones. The desired deformation zone comes into contact with the respective screw stop surface upon the screwing of the top and is gradually deformed during subsequent continued screwing.

In one preferred exemplary embodiment, the geometry of the deformation zone can set the build-up of axial clamping forces between the top and the valve housing in a predeterminable manner. The higher the number of deformation zones, the higher are the deformation forces that can be generated; that is to say, the higher are axial screw clamping forces that can be realized, depending on the rotational path of the top.

In one preferred exemplary embodiment, the at least one desired deformation zone is realized by means of at least one locally delimited raised bulge or camber, which protrudes from one of the planar clamping sides of the base structure. Preferably, the bulge is formed by an embossing of the disc-shaped base ring structure, so that the at least one desired deformation zone has the same cross-sectional thickness as the remaining part of the base ring structure. Thus, it should be achieved that when deforming the desired deformation zone, a concavity corresponding to the bulge is present, wherein the material of the at least one desired deformation zone can spread into the concave clearance or free space. In this manner, a homogeneous two-dimensional pressure force transfer between the top, the deformation buffer, and the valve housing can be achieved.

In one preferred exemplary embodiment, a plurality of desired deformation zones are formed on the base structure preferably with a constant circumferential spacing of 120°, 90° or 60°. Preferably, four or more deformation zones, particularly six deformation zones, are arranged.

In a development of the exemplary embodiment, both the at least one engaging nose of the rotational lock and also the at least one desired deformation zone protrude from the same planar clamping side of the base ring structure. Preferably, the at least one engaging nose and the at least one desired deformation zone protrude from a planar clamping side of the base ring structure in opposite manners. In this case, the engaging nose preferably faces the valve housing. The opposite planar clamping side, which faces the top in particular, is provided with the concave embossing opposite the bulge of the at least one desired deformation zone. In an advantageous embodiment, the at least one engaging nose of the rotational lock and the at least one desired deformation zone protrude from the same side of the base structure and preferably face the valve housing.

In one preferred exemplary embodiment, the deformation buffer has a securing tab, which is in particular arranged on the outer circumference of the base ring structure. The securing tab is bent towards the top or towards the valve housing after the termination of the screwing process. Preferably, the bending direction of the securing tab should be directed oppositely to the protrusion direction of the at least one engaging nose and/or the at least one desired deformation zone.

Further properties, advantages and features become clear by way of the following description of exemplary embodiments on the basis of the drawing figures.

A positioning device according to an exemplary embodiment is generally provided with the reference number 1 in FIG. 1. The positioning device 1 comprises three main constituents, namely the control valve 3, a top 5 screwed to the control valve 3, and an actuator 7 rigidly coupled to the control valve 3 which is optionally installed for realizing the positioning device or can be installed later.

The actuator 7 is realized as a pneumatic drive and equipped with two pneumatic working chambers 11, 13, which are separated from one another in an airtight manner by means of a membrane 15. A coupling ring 17 is fastened on the membrane 15, which allows a rigid coupling of the membrane 15 onto a drive rod 21 of the actuator 7. The membrane 15 is clamped between two drive housing halves 23a, 23b, which delimit the working chambers 11, 13, and in which pneumatic connections 25a, 25b are provided.

A lower drive housing half 23b comprises an output opening for leading through the drive rod 21, which is divided in two and comprises an actuator-side drive rod part 31 and a valve-side output rod part 33. Both rod parts 31, 33 are coupled to one another non-positively and/or positively by means of a rod coupling 35, wherein the rod coupling 35 can be formed by means of two brackets or clamps that are screwed to one another. The brackets engage into a depression of the output rod part 33 close to the rod coupling.

The control valve 3 has a valve housing 54, which defines an inflow 37 and also an outflow 41, wherein the inflow 37 is separated from the outflow 41 by means of a valve seat passage 43. The valve seat passage 43 accommodates a valve seat ring 45, which interacts with a valve member 47 in a closing and opening manner, so that a through flow can either be allowed, partly allowed or blocked by means of the control valve 3. The valve member 47 is fastened on an end of the output rod part 33.

The valve housing 54 is rigidly coupled to the housing of the actuator 7, specifically with the aid of the top 5, which can be constructed as a yoke, bonnet and/or drive-rod guide or drive-shaft guide. In the embodiment illustrated in FIG. 1, the top 5 is realized as a one piece component, which forms both a laterally accessible yoke structure 51 and also a rod or shaft guide insert 53. The top 5 is screwed into an upper lead-through opening 55, which is provided with an internal thread of the valve housing 54, wherein the rod or shaft guide insert 53 of the top 5 has a corresponding external thread for that.

The lead-through opening or duct 55 is realized on the valve housing 54 by means of a neck 57, on the internal surface of which both the internal thread and also sealing surfaces are formed, and wherein a leakage channel 61 extends radially through the vertical neck 57. The leakage channel 61 opens on an internal surface of the vertical neck 57 directly axially below the internal thread, wherein the sealing surfaces, which interact with O-rings 63 of the rod or shaft guide insert 53, are formed further below.

Figure 2:
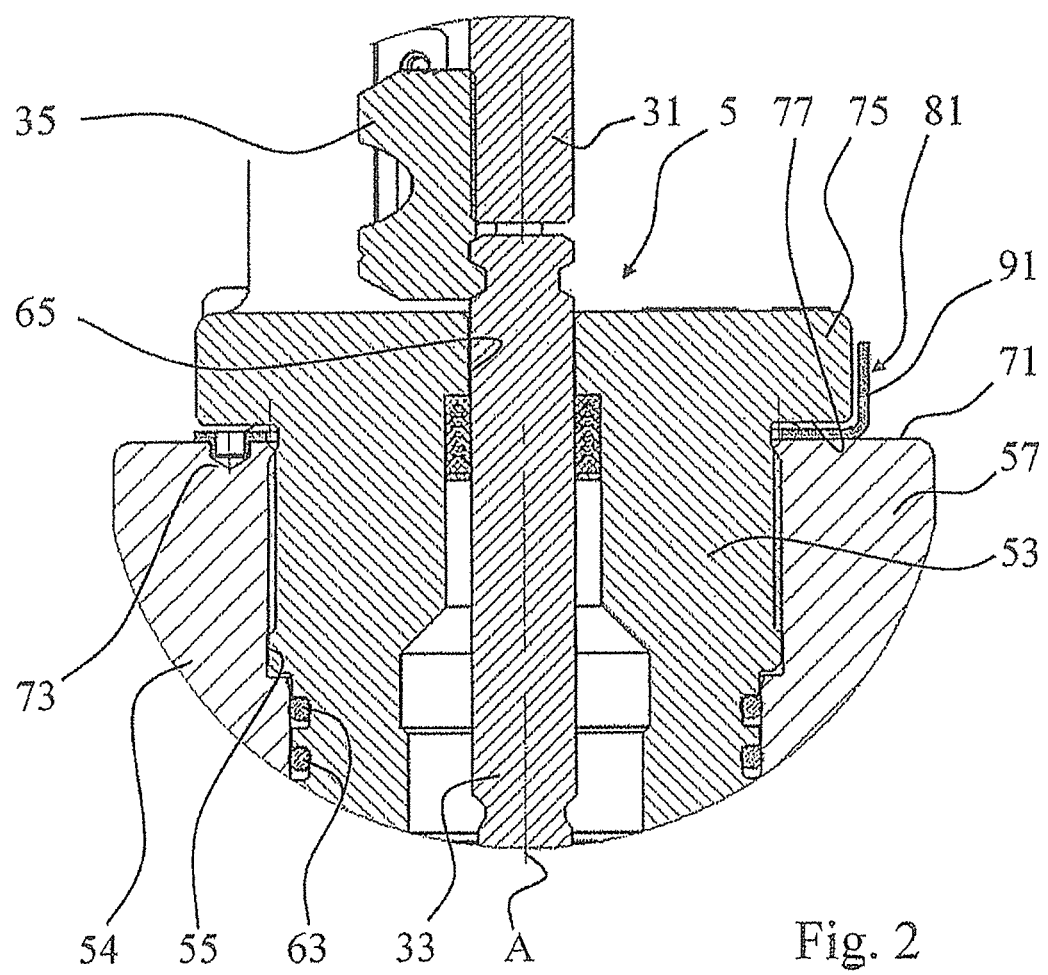
FIG. 2 shows a cross-sectional detail view of a transition region of the field device according to FIG. 1 at the transition between the valve housing and the screwed-in top.
Figure 3:
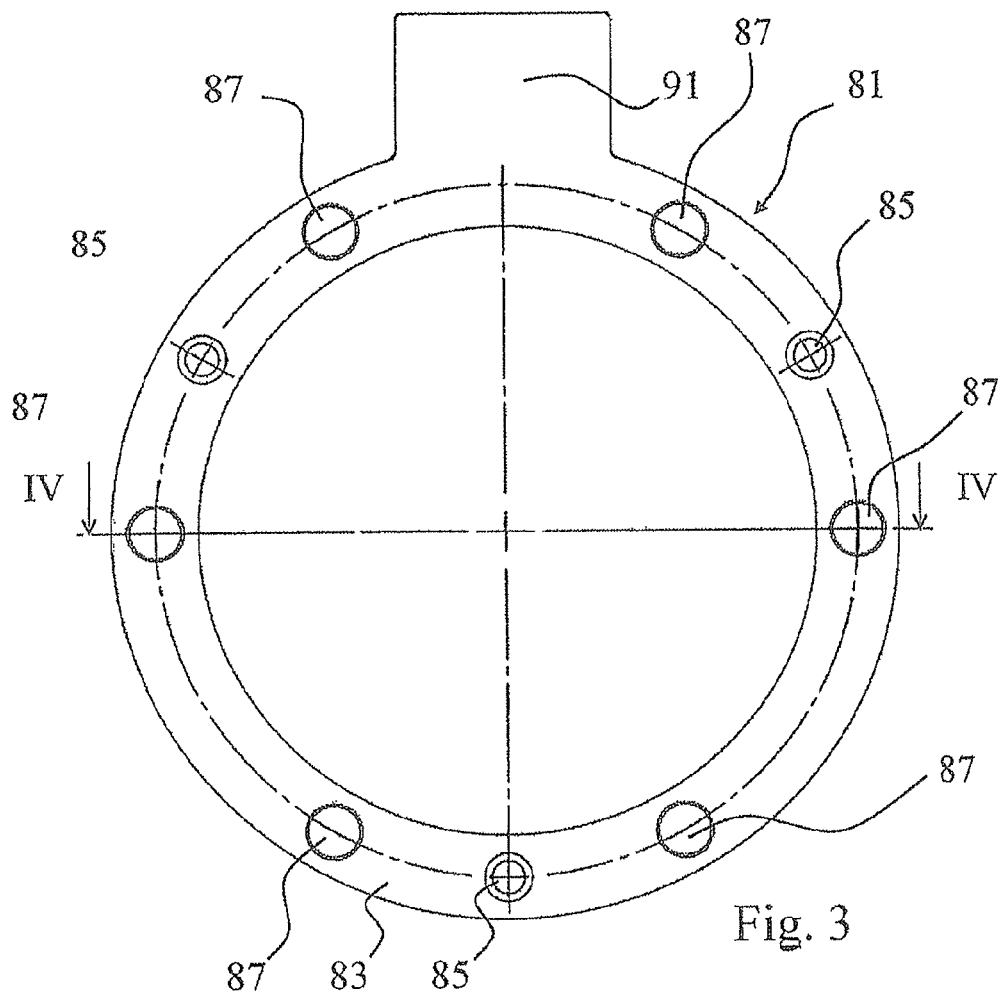
FIG. 3 shows a deformation buffer according to the exemplary embodiment, which is to be clamped between the valve housing and the top.

The rod or shaft guide insert 53 has a sealed passage 65 for leading through the output rod part 33. The passage 65 is widened and shaped like a blind hole towards the valve member 47, wherein an, if appropriate, axially prestressed sealing package is arranged in the blind-hole shaped in widening fashion, which can be realized by a plurality of sealing components connected in series (cf. FIG. 2).

The neck 57 has an annular, planar, radial screw stop surface 71 at the assembly side thereof facing the actuator 7, which runs perpendicularly with respect to the axial direction A, which corresponds to the translational positioning direction of the actuating rod 21. The screw stop surface 71 has a plurality of, preferably three, accommodating depressions 73, at a constant circumferential spacing, which can for example be formed as blind holes. It is also possible for more than three such engagement depressions 73 to be formed on the screw stop surface 71. The screw stop surface 71 interacts with an opposite screw counter-stop surface 77 of a radial mounting shoulder 75 of the top 5, which extends in the radial direction and fixes the radial screw counter-stop surface 77. Inserted between the screw counter-stop surface 77 and the screw stop surface 71 is an annular and disc-shaped base ring structure 81 forming a deformation buffer. When screwing the top, the base ring structure 81 is gradually deformed between the top 5 and the valve housing 54. The deformation buffer 81 has two basic functions, namely a rotational locking and also to achieve a predetermined desired position of the top with respect to the valve part by means of a tolerated desired deformation of the deformation buffer.

The rotational locking ensures that the deformation buffer 81 is not entrained in rotation in the rotational direction when screwing the top 5 into the valve housing 54. The desired deformation is realized by means of a plurality of desired deformation zones, which are formed by a part of the deformation buffer 81. The deformation zone is realized by means of a locally delimited embossing, as a result of which a convex bulge on one clamping side of the deformation buffer 81 and a concave embossing on the other clamping side ensue. The desired deformation zones are gradually deformed in a predetermined manner during the screwing of the top 5, that is to say when interlocking or bracing the deformation buffer 81. This desired deformation ensures that no excessive axial screwing forces, which may possibly damage the thread, are applied and a sudden build-up of axial clamping forces is prevented.

The internal diameter of the deformation buffer 81 essentially corresponds to the internal diameter of the passage 55. The external diameter of the deformation buffer 81 essentially corresponds to the external diameter of the radial shoulder 75. The ring width is essentially constant over the course of the circumference. The axial ring thickness is also uniform over the course of the circumference.

To realize the function of rotational locking, the deformation buffer 81 has at least two, and preferably three, engaging noses 85 on the annular face (clamping side) 83 thereof facing the valve housing 54, all of which engaging noses 85 engage into the corresponding engagement depressions 73 in the screw stop surface 71, so that during screwing and the application of rotational entraining forces, the deformation buffer 81 does not change the circumferential position thereof.

It shall be clear that a corresponding engaging nose 85 can also be formed on the annular face of the deformation buffer 81 facing the actuator 7, wherein in this case, the corresponding engagement depression is to be formed on the screw counter-stop surface 77 of the top 5.

In order to provide the desired deformation zone, the deformation buffer 81 comprises a plurality of embossings, which protrude in convex fashion on an annular face 83 and come into engagement with the screw stop surface 71 or screw counter-stop surface 77. When compressing the deformation buffer, the bulges 87 are plastically deformed in a predetermined manner, in order to delay the generation of clamping forces between the top 5 and the valve housing 54 with regard to the rotational path.

The bulges 87 are concave on the annular face side 89 of the base ring structure 81, while the bulges are convex on the opposite annular face 83. Thus, the engaging noses 85 are differentiated from the bulges 87 in that the axial thickness of the engaging nose proves to be larger than that of the bulge 87, wherein the bulge 87 has a material thickness which corresponds to that of the annular structure of the base ring structure 81, and in that the engaging noses 85 protrude with respect to the bulge 87 on the opposite side of the base ring structure 81.

Preferably, more than four such separate desired deformation zones are formed in the shape of bulges 87 with equal circumferential angle spacings (approximately 60°) on the deformation buffer 81.

Figure 4:
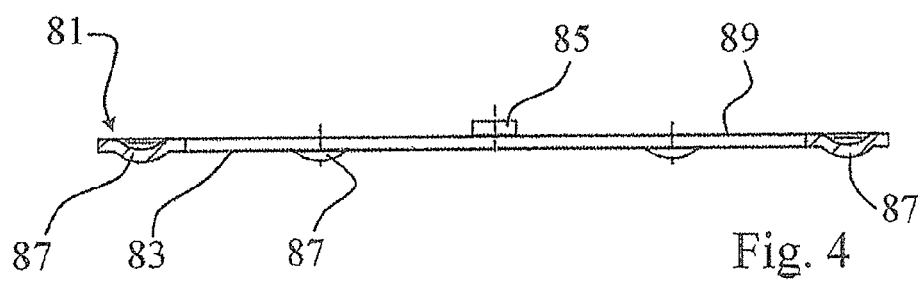
FIG. 4 shows a cross-sectional view of the deformation buffer along the section line IV-IV according to FIG. 3.

The annular deformation buffer 81 has a final assembly tab 91, which, depending on the orientation of the engaging noses and/or the bulges 87 of the desired deformation zone, is bent towards the top 5 or towards the valve housing 54. The bending direction depends on the direction in which the engaging noses 85 are directed. In FIG. 4, the engaging noses 85 are directed towards the valve housing 54, so that the final assembly tab 91 is bent over vertically upwards towards the top 5.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A positioning device for a process plant, comprising:
a valve comprising a valve housing, a valve seat, and a valve member actuated by use of a lead-through opening in the valve housing;
a top configured to screw onto the lead-through opening and to rigidly couple the valve housing to an actuator;
a deformation buffer in the form of a disc arranged between mutually opposite respective screw stop surfaces of the top and of the valve housing and which is deformed in a predetermined manner when screwing the top onto said lead-through opening;
the disc having at least one engaging nose protruding from one side of the disc, said at least one engaging nose being at a radial distance from a center of the disc;
said at least one engaging nose engaging in an engagement depression in the screw stop surface of the top or in the screw stop surface of the valve housing, wherein the engagement depression is shaped complementary to the engagement nose and configured to rotationally lock the disc at a circumferential position;
the disc also having at least one deformation zone facing the top or facing the valve housing and which is deformed gradually when screwing; and
said at least one deformation zone being at least one bulge in the disc, said bulge being at a same radial distance from the center as said radial distance of the at least one engaging nose from the center, the at least one engaging nose being differently shaped from the at least one bulge, wherein the at least one bulge is plastically deformable and configured to plastically deform when the deformation buffer is compressed during assembly of the positioning device.

2. The positioning device according to claim 1 wherein the valve comprises a control valve.

3. The positioning device according to claim 1 wherein the top comprises a yoke, a bonnet, a drive-rod guide, or a drive-shaft guide.

4. The positioning device according to claim 1 wherein a side of the disc that faces the top is annular and planar.

5. The positioning device according to claim 1 wherein a plurality of engaging noses are provided together with a plurality of corresponding engagement depressions.

6. The positioning device according to claim 5 wherein said plurality of engaging noses have a constant circumferential spacing of 120°, 90°, or 60°.

7. The positioning device according to claim 1 wherein a plurality of bulges are provided.

8. The positioning device according to claim 7 wherein the plurality of bulges are formed with a constant circumferential spacing of 120°, 90°, or 60°.

9. The positioning device according to claim 1 wherein the at least one engaging nose faces the valve housing, and said at least one bulge protruding oppositely to the engaging nose and which faces said top.

10. The positioning device of claim 1 wherein said disc includes a securing tab configured to bend towards the top or toward the valve housing based on a termination of the screwing of the top.

11. The positioning device of claim 1 wherein said at least one bulge comprises:
a convex protrusion from a second side of the disc opposite the one side of the disc; and
a corresponding concave impression on the one side of the disc.

12. The positioning device of claim 1 wherein:
the at least one bulge has a first thickness that is a same thickness as a planar portion of the disc; and
the at least one engaging nose has a second thickness greater than the first thickness.

13. A positioning device for a process plant, comprising:
a valve comprising a valve housing, a valve seat, and a valve member actuated by use of a lead-through opening in the valve housing;
a top configured to screw onto the lead-through opening and to rigidly couple the valve housing to an actuator;
a deformation buffer comprising a disc between mutually opposite respective screw stop surfaces of the top and of the valve housing and which is deformed in a predetermined manner when screwing the top onto said lead-through opening;
the disc having at least one engaging nose protruding from one side of the disc;
said at least one engaging nose engaging in an engagement depression in the screw stop surface of the top or in the screw stop surface of the valve housing, wherein the engagement depression is shaped complementary to the engagement nose and is configured to rotationally lock the disc at a circumferentially position;
said disc having a plurality of angularly-spaced bulges extending from a side of the disc for engagement with the screw stop surface of the top or the screw stop surface of the valve housing, wherein the plurality of angularly-spaced bulges project from only a second side of the disc opposite the one side of the disc and in a direction which is opposite to a direction that said at least one engaging nose projects from the one side of said disc; and wherein the at least one bulge is plastically deformable and configured to plastically deform when the deformation buffer is compressed when the valve housing and the top are assembled.

14. The positioning device according to claim 13 wherein each of the bulges has a dome-shape.

15. The positioning device of claim 13 wherein the bulges impact a flat surface formed by said screw stop surface of the top or screw stop surface of the valve housing.

16. The positioning device of claim 13 wherein the disc includes a securing tab that is configured to bend towards the top or towards the valve housing based on a termination of the screwing of the top.

17. The positioning device according to claim 13 wherein the valve comprises a control valve.

18. The positioning device according to claim 13 wherein the top comprises a yoke, a bonnet, a drive-rod guide, or a drive-shaft guide.

19. The positioning device according to claim 13 wherein a plurality of engaging noses and a corresponding plurality of engagement depressions are provided.

20. The positioning device of claim 19 wherein the plurality of bulges are at a same radial distance from a center of the disc.

21. The positioning device according to claim 20 wherein said at least one engaging nose is at a same radial distance from the center of the disc as the radial distance of the bulges from the center.

* * * * *